(12) United States Patent
Turner et al.

(10) Patent No.: US 7,694,335 B1
(45) Date of Patent: Apr. 6, 2010

(54) SERVER PREVENTING ATTACKS BY GENERATING A CHALLENGE HAVING A COMPUTATIONAL REQUEST AND A SECURE COOKIE FOR PROCESSING BY A CLIENT

(75) Inventors: Bryan C. Turner, Apex, NC (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1338 days.

(21) Appl. No.: 10/795,312

(22) Filed: Mar. 9, 2004

(51) Int. Cl.
*G06F 9/00* (2006.01)

(52) U.S. Cl. .............. 726/14; 726/12; 726/9; 726/10; 726/22; 726/23; 726/3; 726/29; 713/168; 713/178; 713/179; 713/176; 713/181; 708/250; 708/254; 708/255

(58) Field of Classification Search ............ 726/3, 726/12, 9, 10, 22, 23, 14, 29; 380/277–286, 380/44–55, 30; 713/168, 178–179, 176, 713/181; 708/250, 254–255
See application file for complete search history.

(56) References Cited

U.S. PATENT DOCUMENTS

| | | | | |
|---|---|---|---|---|
| 5,907,621 | A * | 5/1999 | Bachman et al. | 713/155 |
| 5,958,053 | A * | 9/1999 | Denker | 726/1 |
| 6,735,313 | B1 * | 5/2004 | Bleichenbacher et al. | 380/241 |
| 6,779,033 | B1 * | 8/2004 | Watson et al. | 709/227 |
| 6,944,663 | B2 * | 9/2005 | Schuba et al. | 709/225 |
| 6,944,765 | B1 * | 9/2005 | Rose et al. | 713/181 |
| 6,948,074 | B1 * | 9/2005 | Borella et al. | 726/14 |
| 7,139,679 | B1 * | 11/2006 | McGrew | 702/186 |
| 7,197,639 | B1 * | 3/2007 | Juels et al. | 713/168 |
| 7,233,997 | B1 * | 6/2007 | Leveridge et al. | 709/229 |
| 2001/0042200 | A1 | 11/2001 | Lamberton et al. | |
| 2002/0032727 | A1 | 3/2002 | Dias et al. | |
| 2003/0135625 | A1 * | 7/2003 | Fontes et al. | 709/228 |
| 2003/0172159 | A1 * | 9/2003 | Schuba et al. | 709/225 |
| 2004/0030932 | A1 * | 2/2004 | Juels et al. | 713/202 |
| 2004/0039708 | A1 * | 2/2004 | Zhang et al. | 705/67 |

(Continued)

OTHER PUBLICATIONS

Deanna Koike, Client Puzzles as a Defense Against Network Denial of Service, Dec. 4, 2002, pp. 1-10.*

(Continued)

*Primary Examiner*—Edan Orgad
*Assistant Examiner*—Canh Le
(74) *Attorney, Agent, or Firm*—Leon R. Turkevich (57) ABSTRACT

A server is configured for preventing flood attacks by a client having sent a request, by dynamically generating a challenge to be performed by the client before the server will perform any work for the client. The challenge includes a dynamically generated computational request and a dynamically generated secure cookie. The server generates a first hash result based on hashing a first random number, having a prescribed length, with a second random number having a dynamically selected length. A secure cookie is generated based on hashing the first hash result with a prescribed secure key known only by the server, and a unique identifier for the request such as the client network address with a time stamp. The challenge requires the client to determine the second random number based on the first random number and the hash result. The server validates the challenge results using the secure cookie.

36 Claims, 4 Drawing Sheets

U.S. PATENT DOCUMENTS

| | | | |
|---|---|---|---|
| 2004/0111635 A1* | 6/2004 | Boivie et al. | 713/201 |
| 2004/0125799 A1* | 7/2004 | Buer | 370/389 |
| 2004/0154028 A1* | 8/2004 | Wang et al. | 719/330 |
| 2005/0050364 A1* | 3/2005 | Feng | 713/201 |
| 2005/0091545 A1* | 4/2005 | Soppera | 713/202 |
| 2006/0075122 A1* | 4/2006 | Lindskog et al. | 709/228 |

OTHER PUBLICATIONS

Ari Juels and John Brainard, Client Puzzles: A Crypto Counter Against Connection Depletion Attacks, 1999, pp. 1-15.*

Vorapranee Ku-smith and Chris Mitchell, Enhancing the Security of Cookies, Springer-Verlag Berlin Heidelberg 2002, pp. 132-145.*

Tuomas Aura et al, DOS-Resistant Authentication with Client Puzzles, Springer-Verlag Berlin Heidelberg 2001, pp. 170-177.*

T. Chen et al. ,Denial of Service Protection for Optimized and QoS-aware Handover Based on Localized Cookies, Proceedings of 5th European Wireless Conference—Mobile and wireless System beyond 3G, Feb. 24-27, 2004, Barcelona, Spain, pp. 1-7.*

Mankins et al., "Mitigating Distibuted Denial of Service Attacks with Dynamic Resource Pricing", BBN Technologies, http://www.ir.bbn.com/~ktash/pubs/mankins_acsac01.pdf, Dec. 10-14, 2001.

Giovanni. "Topology of Denial-of-Service", Endeavor Systems, Inc., Jul. 12, 2000, pp. 1-4, www.eurocomptom.net/stick//papers/TopologyDOS.pdf.

Eronen, "Denial of Service in Public Key Protocols", Helsinki University of Technology, pp. 1-13, http://www.cs.hut.fi/~peronen/publications/netsec_2000.pdf, Nov. 26, 2000.

Chung, "An Evaluation on Defensive Measures against Denial-of-Service Attacks", Department of Computer Science, University of Southern California, Fall 2002, pp. 1-11, http://www.scf.usc.edu/~hochuns/research/eval-ddos.pdf.

Housley, "A 224-bit One-way Hash Function: SHA-224", Internet Engineering Task Force, PKIX Working Group, Internet Draft, draft-ietf-pkix-sha224-00.txt, Dec. 2003.

Hildrum, "Why Do We Need Locality?", Feb. 17, 2004, http://oceanstore.cs.berkeley.edu/info/whytapestry.html.

Hildrum, "The Ocean Store Project", Feb. 17, 2004, http://oceanstore.cs.berkeley.edu/info/overview.html.

"Kerberos: The Network Authentication Protocol", Feb. 7, 2004, http://web.mit.edu/kerberos/www.

Wells, "The OceanStore Archive: Goals, Structures, and Self-Repair", U.C. Berleley Masters Report, May 2000.

Chen et al., "Quantifying Network Denial of Service: A Location Service Case Study", *Proceedings of the Third International Conference on Information and Communications Security (ICICS 2001)*, Xian, China, Nov. 2001.

* cited by examiner

Figure 5

SERVER PREVENTING ATTACKS BY GENERATING A CHALLENGE HAVING A COMPUTATIONAL REQUEST AND A SECURE COOKIE FOR PROCESSING BY A CLIENT

BACKGROUND OF THE INVENTION

1. Field of the Invention

The present invention relates to preventing denial of service attacks in peer-to-peer systems caused by clients flooding a server with requests.

2. Description of the Related Art

Peer-to-peer systems may encompass a heterogeneous collection of computing resources owned by numerous individuals and institutions. In particular, two devices operate as peers across a network by exchanging requests and responses. A typical example is a client-server model where a client computer sends a request via the network to the server for some work (i.e., use of server resources), for example an HTTP request for a web page. These networks are often subject to Denial of Service attacks, where one device (e.g., a client) attacks a peer device (e.g., a server) by "flooding" the server with irrelevant requests or insertion of malicious data into the requests.

There are three major points of failure in peer-to-peer systems: the network, the peer node, and the end user.

Network burden (often called "bandwidth depletion") is caused by flooding a peer node with more packets than the infrastructure (i.e., the network) can handle. Valid service requests are dropped by the packet routers before they reach the node providing service. One example involves propagation of a computer virus throughout a network such as the Internet, that includes malicious code causing the infected computers to send the frivolous requests at a certain date and time in the future after the computer virus has had sufficient time to proliferate throughout the network. To date there is no known solution to preventing network burden attacks.

Server burden may occur when clients request computationally-expensive services from a service provider. These requests deplete server resources (such as compute-time, memory, and disk space) until the server is incapable of providing service to other clients. Common forms of attack on servers include SYN-flood, buffer overrun, log rollover, and continuous re-authentication.

User burden occurs when the peer network supplies too much information for a request, requiring an excessive time investment to extract the useful information. For example, uncooperative clients may insert invalid data (i.e., null or junk data), requiring end users to wade through the responses to locate the useful material.

Typical approaches to SYN-flood attacks and Junk Data attacks have included adding client identification and authorization by a service authority for network access and/or server access. The service authority may then monitor resource usage between the peer devices. Such arrangements, however, require a central database of identities or a trusted entity which is queried for authenticity. Consequently, such arrangements require prior registration or authorization, and as such are not entirely feasible for ad-hoc distributed systems that are unable to rely on (or avoid use of) a centralized authority.

Hence, a fully ad-hoc distributed system cannot rely on any central service or trusted entity for controlling against SYN-flood and Junk Data attacks.

SUMMARY OF THE INVENTION

There is a need for an arrangement that enables a server to provide computing resources for a transaction on behalf of a client while remaining resistant to denial of service attacks without the need for a centralized database or authentication service.

There also is a need for an arrangement that enables a server to provide computing resources for a transaction on behalf of a client while remaining resistant to denial of service-based attacks such as SYN-flood and Junk Data attacks, without the need for storing information associated with the transaction or the client.

There also is a need for an arrangement that enables a server to provide computing resources for a client while remaining resistant to denial of service-based attacks, without the need for another entity that serves as an agent or proxy between the server and the client. For example, there is a need for controlling denial of service based attacks (e.g., SYN-flood attacks and Junk Data attacks), without the need for a centralized database an authentication service.

These and other needs are attained by the present invention, where a server is configured for preventing flood attacks by a client having sent a request, by dynamically generating a challenge to be performed by the client before the server will perform any work for the client. The challenge includes a dynamically generated computational request and a dynamically generated secure cookie. The server generates a first hash result based on hashing a first random number, having a prescribed length, with a second random number having a dynamically selected length. A secure cookie is generated based on hashing the first hash result with a prescribed secure key known only by the server, and a unique identifier for the request such as the client network address with a time stamp. The challenge requires the client to determine the second random number based on the first random number and the hash result. The server validates the challenge results by hashing the challenge results together with the prescribed secure key, and comparing the resulting hash value with the secure cookie.

Hence, the server can prevent flood attacks by requiring the clients to solve the challenge; further, the use of a dynamically selected length for the second random number enables the server to adjust the difficulty level in solving the challenge. Consequently, challenges of varying difficulty levels can be output by the server, requiring the clients to expend more resources for a given transaction than required by the server.

One aspect of the present invention provides a method in a server configured for receiving a request from a client. The method includes dynamically generating, in response to the request, a computational request and a secure cookie. The server selects a first random number having a prescribed length, a second length corresponding to a difficulty level for the computational request, and a second random number having the second length. A first hash result is generated having the prescribed length and based on hashing the first random number with the second random number according to a prescribed hash function. The computational request specifying the first hash result, the first random number, and a length value specifying the second length. A secure cookie is generated based on generating a second hash result based on hashing the first hash result with a prescribed secure key according to the prescribed hash function, the prescribed secure key known only by the server. The method also includes outputting to the client a challenge that includes the computational request and the secure cookie, the challenge requiring the client to determine the second random number and return a client response specifying the first random number, the second random number, the first hash result, and the secure cookie, as a condition precedent to the server performing work for the client.

Dynamic selection of the second length enables the server to control the difficulty level for the computational request. Hence, the client will need to perform multiple iterations to determine the second random number that, when hashed with the first random number, results in the first hash result. Moreover, the transfer of the secure cookie enables the server to optimize validation of the response to the challenge by the client, merely by comparing a hashing of the response to the challenge and the prescribed secure key with the secure cookie returned with the response to the challenge.

Another aspect of the present invention provides a server configured for receiving a request from a client. The server includes a network interface, a hash generator, and an executable resource. The network interface is configured for receiving the request from the client via a network and outputting a challenge. The hash generator is configured for outputting a hash result having a prescribed length according to a prescribed hash function. The executable resource is configured for dynamically generating, and inserting into the challenge, a computational request and a secure cookie. In particular, the executable resource configured for selecting a first random number having the prescribed length, and a second random number having a second length selected according to a corresponding selected difficulty level for the computational request, and supplying the first random number and the second random number to the hash generator for generation of a first hash result. The executable resource also is configured for supplying to the hash generator the first hash result and a prescribed secure key for generation of a second hash result, the prescribed secure key known only by the server. The executable resource also is configured for inserting the first random number, a length value specifying the second length, and the first hash result into the computational request and inserting the second hash result into the secure cookie. The challenge requires the client to generate a client response, including the first random number, the second random number, the first hash result, the length value, and the secure cookie, as a condition precedent to the server performing work for the client.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
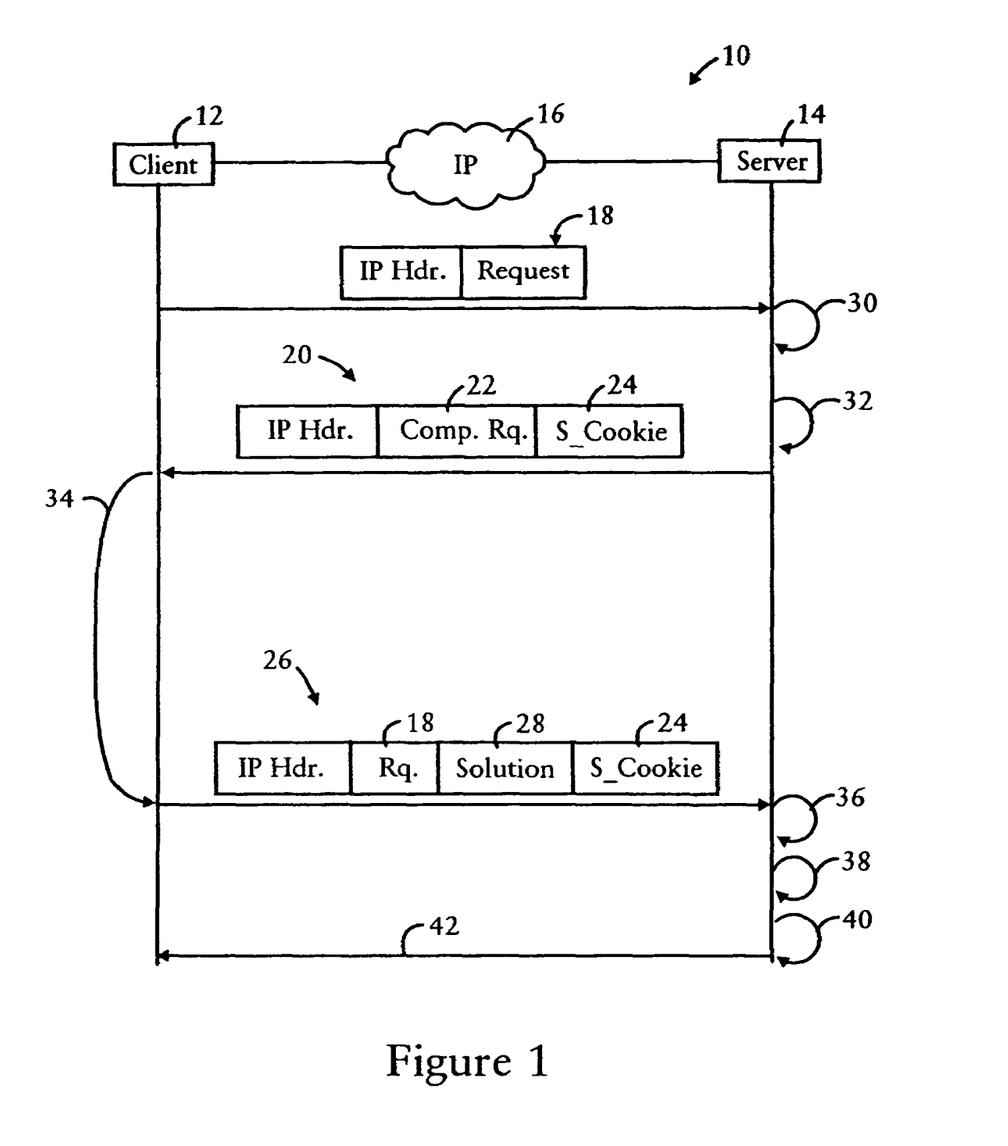
FIG. 1 is a diagram illustrating client-server interaction that includes a secure cookie-based challenge-response protocol between the server and the client as a condition precedent to the server performing work for the client, according to an embodiment of the present invention.

FIG. 1 is a diagram illustrating a peer-to-peer network 10 including a first peer node 12, referred to as the client, and a second peer node 14, referred to as the server. The client 12 and the server 14 are configured for exchanging messages via a network 16, for example an Internet protocol network.

In particular, the typical client-server transaction involves the client 12 sending a request 18 to the server 14 via the network 16. The request 18 includes a source address field that specifies the IP address of the client 12, a destination IP address that specifies the IP address of the server 14, higher level protocol identifiers such as TCP or UDP source and destination ports, and a request for some operation (i.e., work) to be performed that necessitates the expenditure of resources by the server 14.

As described above, concerns arise that the client 12 may be a malicious source that sends the request 18 in order to waste resources on the server 14, for example in the form of a SYN-flood attack or a Junk Data attack. As described above, however, it is desirable to eliminate the necessity of an agent interacting between the client 12 and the server 14. Further, it is desirable for the server 14 to be able to manage incoming requests without the necessity of storing state information associated with the request 18 or the client 12 pending completion of the transaction between the client 12 and the server 14.

According to the disclosed embodiment, the server 14 responds to the request 18 in steps 30 and 32 by dynamically generating a challenge 20 to the client 12. The challenge 20 includes a computational request (Comp. Rq.) 22 generated in step 30 and a secure cookie (S_Cookie) 24 generated in step 32, described below. The challenge 20 requires the client 12 to solve in step 34 the computational request 22 as a condition precedent to any work being performed by the server 14 in step 40 on behalf of the client 12.

The client 12 is required to return to the server 14 a response 26 to the challenge 20 that includes the initial request 18, a solution 28 to the computational request 22, and the secure cookie 24. The server 14 parses the solution 28, the secure cookie 24, and the source IP address identifying the client 12 in step 36, and validates in step 38 the parsed parameters relative to a secure portion of the secure cookie 24. Upon validating the response 26, the server 14 performs the requested work in step 40, and outputs the work results in step 42 to the client.

The computational request 22 is generated by the server in step 30 such that the client 12 will need to consume a substantially greater amount of client resources in step 34 in order to solve the computational request 22, compared to the total resources required by the server 14 to receive the initial request, generate the challenge in steps 30 and 32, validate the response 26 in steps 36 and 38, and perform the work in step 40. Hence, the server 14 can ensure that server resources are available regardless of the number of requests 18 issued by any client 12.

As described below, the server 14 also is able to dynamically select the difficulty of the challenge 20, for example increasing the difficulty level when a large number of requests are received. Other factors may determine the selection of the difficulty level, for example distinguishing certain clients 12 based on their respective IP addresses as to whether the clients are members of a prescribed membership class related to organizational membership, subscription services, etc.

As described below, the secure cookie 24 generated in step 32 not only provides authentication for the client 12, but also minimizes the resources necessary for validating the solution 28 based on providing a comparison between the solution 28 and an encrypted version of the solution stored in the secure cookie 24. Additional parameters may be stored in the secure cookie 24, for example parameters that can be used to uniquely identify the client 12 and its associated request 18, or a request context that identifies the relative cost in executing the requested service by the server.

Hence, the challenge 20 generated by the server 14 ensures that a malicious client (e.g., a rogue node) cannot gain an advantage over cooperative nodes. Moreover, the challenge 20 enables the control of flood attacks without the need for a central or trusted entity. Hence, the disclosed arrangement of generating a challenge 20 by the server 14 is scalable within a network based on implementing the disclosed challenge-response protocol across all servers. Further, the challenge 20 is dynamically generated by the server 14 in steps 30 and 32, enabling the server 14 to control resource consumption in clients in a scalable manner, enabling dynamic security levels to be established in the system 10.

Figure 2:
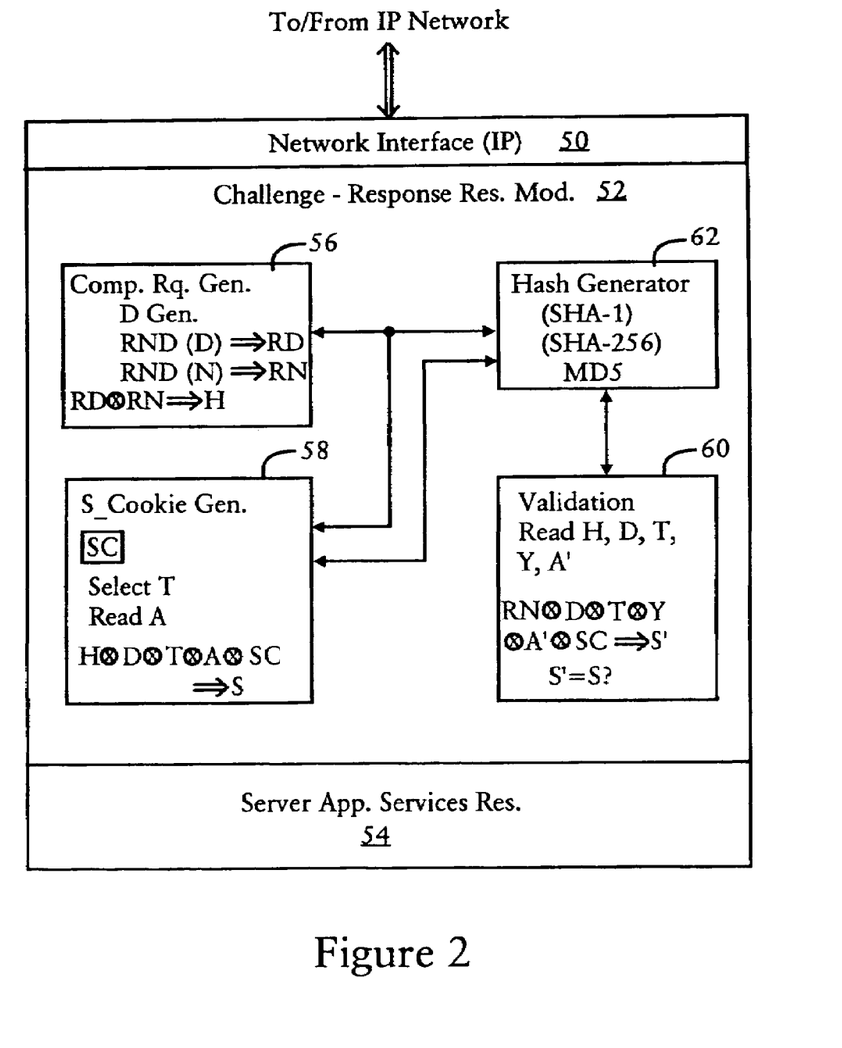
FIG. 2 is a diagram illustrating in detail the server of FIG. 1.

FIG. 2 is a diagram illustrating the server 14 according to an embodiment of the present invention. The server 14 includes a network interface 50, an executable challenge-response resource module 52 configured for generating the challenge 20 and validating the response 26, and a server application services resource 54. The network interface 50 is configured for receiving the request 18 and the response 26 from the client 12 via the IP network 16. The network interface 50 also is configured for outputting the challenge 20 and any results for work performed for the client 12 in step 40 by the server application services resource 54. Depending on implementation, the challenge-response module 52 and the application services resource 54 may be separate, or may be integrated.

The challenge-response resource module 52 is configured for executing the above-described steps 30, 32, 36, and 38 relating to challenging the client 12 and validating its response 26. In particular, the challenge-response resource module 52 includes a computational request portion 56, a secure cookie generation portion 58, a validation portion 60, and a hash generator 62. Each of the portions 56, 58, and 60 are configured for sharing parameters as needed, and supplying inputs to the hash generator 62 and reading hash results. The hash generator 62 is configured for outputting a hash result having a prescribed length (N bits) and according to a prescribed hash function, for example SHA-1, SHA-256, or MD5.

The computational request portion 56 is configured for dynamically generating a first hash result (H) as part of the computational request 22, and the secure cookie generation portion 58 is configured for dynamically generating the secure cookie 24. The challenge-response resource module 52 inserts the request 22 and the secure cookie 24 into the challenge 20 in the form of an IP-based packet. The term "dynamically generating" refers to generating a new value for each received request 18; hence, each received request 18 will have its own corresponding dynamically generated value by the resources in the server 14.

The computational request portion 56 dynamically generates the first hash result (H) by selecting for each request 18 a difficulty level (D), where "D" specifies the length in bits of a random number (RD). Hence, the computational request portion 56 selects for each request 18 a difficulty level (D), a D-bit random number (RD), and an N-bit random number (RN).

Figure 3:
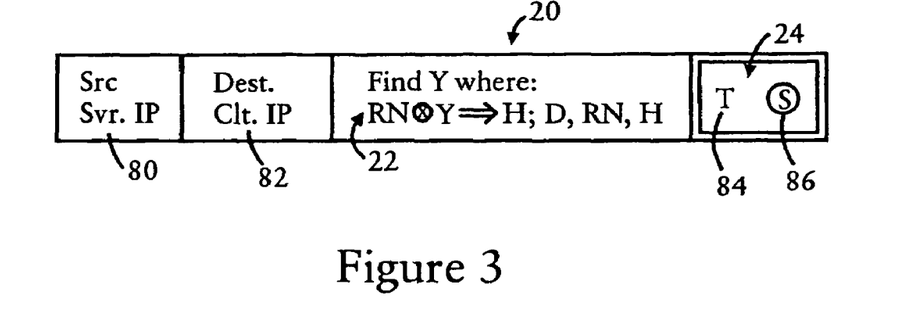
FIG. 3 is a diagram illustrating in detail the challenge output by the server in FIG. 1, according to an embodiment of the present invention.

FIG. 3 is a diagram illustrating the challenge 20 generated by the challenge-response resource module 52. The challenge 20 includes a source address field that specifies the server IP address 80, a destination address field that specifies the client IP address 82, the computational request 22, and the secure cookie 24. As illustrated in FIG. 3, the computation request 22 specifies the parameters difficulty level (D), the N-bit random number (RN), and a first hash result (H).

The first hash result (H), output by the hash generator 62, represents one of the parameters of the computation request 22. In particular, the computational request portion 56 supplies the first random number (RN) and the second random number (RD) to the hash generator 62 for generating the first hash result (H). The challenge-response resource module 52 specifies in the computational request that the client 12 must determine the value of the unknown D-bit operand (Y), which when hashed with the first random number (RN) results in the first hash result (H).

The secure cookie generation portion 58 is configured for generating the secure cookie 24, based on hashing together the computational request 22 with a secure key (SC) which is known only by the server. In addition, the secure cookie generation portion 58 selects a unique identifier to be associated with the request 18 generated by the client 12, by including in the hash operations the client IP address 82 (A), and a timestamp value (T) 84. In order to optimize hashing operations, the secure cookie generation resource 58 also utilizes the first hash result (H), eliminating the necessity of repeating the hash operations using the first and second random numbers (RD, RN). Hence, the secure cookie generation resource 58 sends to the hash generator 62 the first hash result (H) (representing hashing of the random values RD and RN), the difficulty level (D), the timestamp value (T) 84, the client IP address (A) 82, and the secure key (SC), causing the hash generator 62 to output the N-bit second hash result (S) 86 according to the prescribed hash function.

The secure cookie generator 58 combines the timestamp value 84 and the second hash result (S) 86 together to form the secure cookie 24. Note that the timestamp value 84 and the second hash result (S) 86 may be encapsulated using prescribed cryptographic means, so long as the server is able to parse the secure cookie 24 and retrieve the timestamp value 84 and the second hash result (S) 86.

The challenge-response resource module 52 then generates the challenge 20 by adding the necessary IP header including the addresses 80, 82, and sends the challenge 20 to the network interface 50 for transmission to the client 12.

Figure 4:
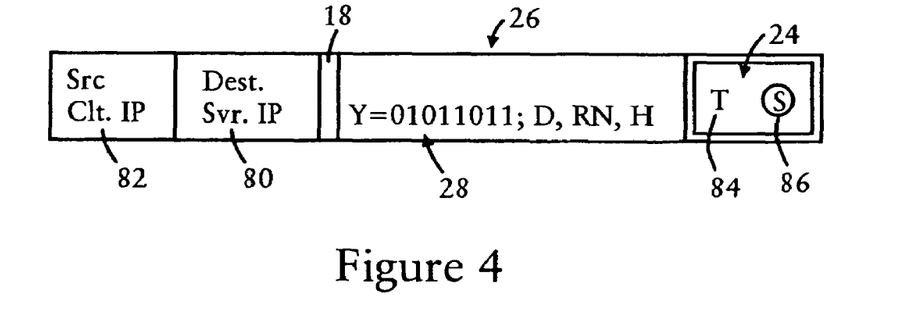
FIG. 4 is a diagram illustrating in detail the response to the challenge output by the client in FIG. 1, according to an embodiment of the present invention.

FIG. 4 is a diagram illustrating the response 26 to the challenge 20 that is output by the client 12. The response 26 includes the client IP address 82 as a source address, the server IP address 80 as the destination address, the initial request 18, the solution 28, and the secure cookie 24. The solution 28 complies with the challenge 20, which requires the client to provide the parameters D, RN, H, plus the candidate number (Y) determined by the client 12 in step 34 as the solution which when hashed with the random number (RN) results in the first hash value (H).

Referring to FIG. 2, the validation resource 60 is configured for validating the response 26 having been generated by the client 12 and solving the challenge 20. In particular, the validation resource 60 parses in step 36 the client IP address 82 (A'), the candidate number (Y), and the supplied parameters D, RN, H. If necessary, the validation resource 60 also performs a secure decapsulation of the secure cookie 24 in order to retrieve the timestamp value 84 and the second hash result (S) 86. The validation resource 60 then supplies in step 36 the parameters A', Y, D, RN, T retrieved from the response 26, plus the secure key (SC) stored within the server 14, to the hash generator 62 for generation of the third hash result (S'). If a match is detected in step 38 by the validation resource 60 between the second hash result (S) 86 and the third hash result (S'), then the validation resource 60 validates that the same client 12 having output the request 18 solved the challenge 20.

Note that if another computer attempted to solve the same challenge 20, for example in the case of multiple computers, the validation would fail due to the different client IP addresses used to generate the hash values S and S'. Similarly, if the same response 26 was replayed, use of the time value (T) can be used as an anti-replay mechanism by requiring the difference between the current system time of the server 14 and the timestamp value (T) 84 to fall within a prescribed time window, for example two seconds. As such, it should be noted that different parameters may be utilized within the secure cookie 24, depending on the complexity desired and level of security; at a minimum, however, the second hash result (S) 86 should at least be hashed with the first hash result (H) and the secure key (SC).

Figure 5:
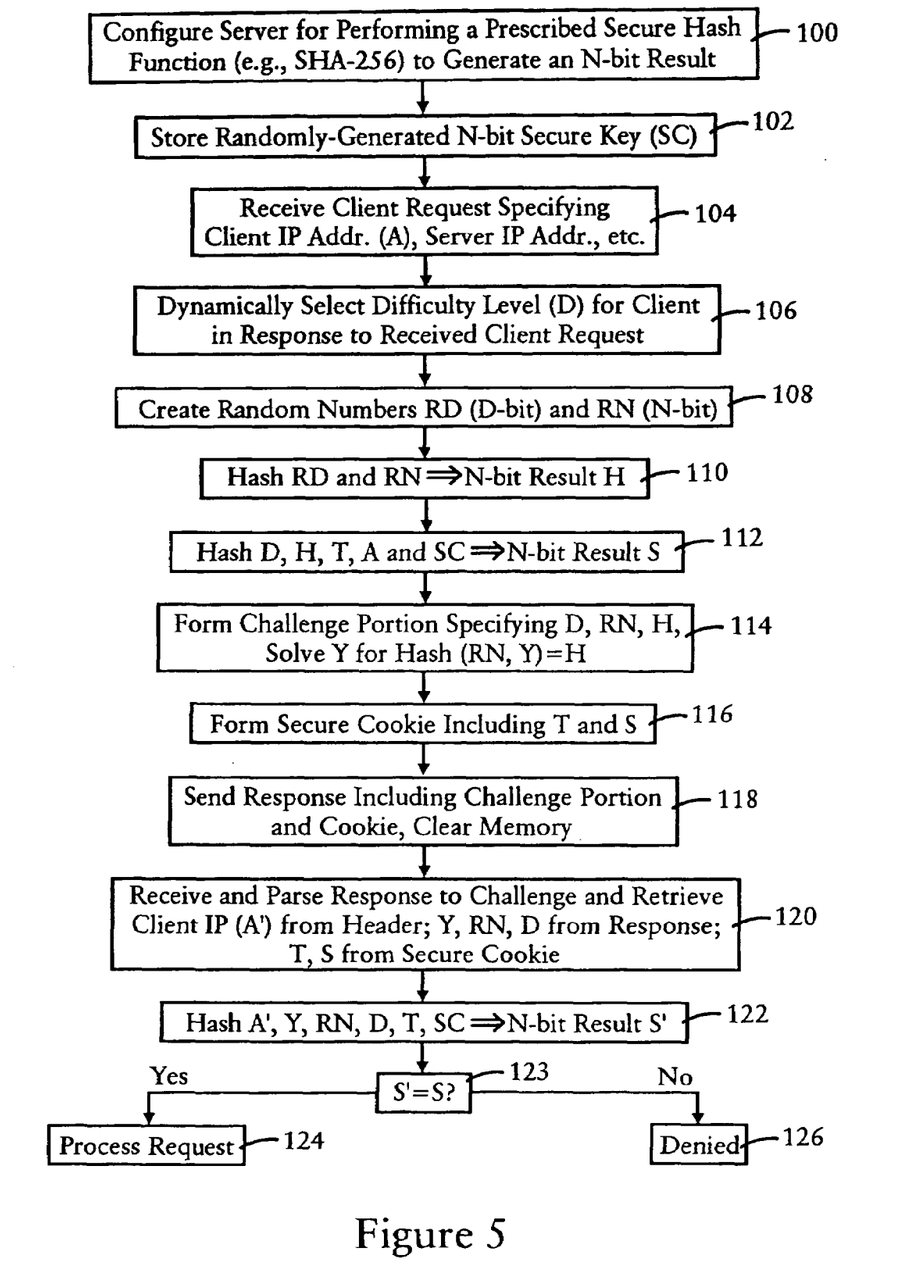
FIG. 5 is a diagram illustrating the method of executing the challenge-response protocol of FIG. 1 by the server, according to an embodiment of the present invention.

FIG. 5 is a diagram illustrating the method of executing the challenge-response protocol, by the server 14, according to an embodiment of the present invention. The steps described herein with respect to FIG. 5 can be implemented as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 100, where the hash generator 62 is configured for performing a prescribed secure hash function in order to generate a prescribed N-bit result. As described above, the prescribed hash function may be implemented, for example, based on the SHA-1, SHA-256, or MD5 hash functions.

The server also establishes in step 102 an N-bit server secret as a prescribed secure key that is known only by the server. Hence, the server 14 typically will generate and store the secure key (SC) in volatile memory, requiring regeneration of a new secure key upon reset or power up.

The server 14 receives in step 104 the client request 18 which specifies the client IP address 82 as the source address, the server IP address 80 as the destination address, etc. Since the request 18 does not have an attached secure cookie 24, the computational request portion 56 implements step 30 by dynamically selecting in step 106 a difficulty level (D), creating in step 108 the random numbers RD and RN, and sending in step 110 the random numbers RD and RN to the hash generator 62 for generation of the first hash result (H).

The challenge-response resource module 52 implements step 32 by having the secure cookie generation portion 58 select the current time as the timestamp value (T) and retrieve the client IP address 82, and sending in step 112 the difficulty level (D), the first hash result (H), the timestamp value (T) 84, the client IP address (A) 82, and the secure key (SC) to the hash generator 62 for generating the second hash result (S). The challenge-response resource module 52 forms the challenge portion 22, also referred to as the computational request, specifying the D, RN, H, and requiring the client 12 to solve the unknown parameter Y for the prescribed hash function Hash (RN, Y)=H. The secure cookie generation portion 58 encapsulates the timestamp value 84 and the second hash result (S) 86 to form the secure cookie 24 in step 116.

The challenge-response resource module 52 then outputs the challenge 20 in step 118, and clears in step 118 the memory of all data associated with the request 18, the challenge 20, and the steps 30 and 32. Hence, the challenge-response resource module 52 clears in step 118 the request 18, the computational request 22, the secure cookie 24, the entire challenge 20, and the parameters D, RD, RN, H, T, A, as well as any other data (e.g., a request context) associated with the dynamic generation of the challenge 20, except for the secure key (SC) which is maintained in memory. If preferred, the memory may be cleared in step 118 by overwriting the relevant memory with new data in response to receiving another request 18 and executing the associated steps 30 and 32.

The client 12, in response to receiving the challenge 20, needs to perform a computationally expensive iteration in order to determine the unknown parameter Y. Once the client 12 has solved the challenge 20 and output the response 26 to the server 14, the validation resource 60 parses in step 120 the response and retrieves the client IP address (A') (assuming it is not the same as A) from the IP header, the solution Y, and the parameters RN, and D. The validation resource 60 decapsulates the secure cookie 24 if necessary, and retrieves the timestamp value 84 and the second hash result (S) 86.

The validation resource 60 generates a third hash result (S') in step 122 by supplying the parameters A', Y, RN, D, T from the response 26, and the stored secure key (SC), to the hash generator 62. If in step 123 the third hash result (S') matches the second hash result (S), the response 26 is validated and the server application services resources 54 processes the request 18 in step 124. However, if in step 123 the second and third hash results do not match, the validation resource 60 denies the request 18 in step 126 such that no further processing is performed for the request 18.

According to the disclosed embodiment, a computationally expensive challenge-response protocol is applied, where a difficulty level is dynamically generated for a given request. Further, the combination of generating the computational request 22 in the secure cookie 24 based on sharing existing cookie resources optimizes the use of the existing server resources, including minimizing hash procedures by using the first hash result (H) in generating the second hash result (S).

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a server device including a computer readable storage medium and configured for receiving a request from a client, the method comprising: generating by the server device, in response to the request, a computational request and a secure cookie, by:

(1) selecting a first random number having a prescribed length in bits, a second length in bits corresponding to a difficulty level for the computational request, and a second random number having the second length, (2) generating a first hash result having the prescribed length and based on supplying the first random number and the second random number to a hash generator in the server device for generation of the first hash result according to a prescribed hash function, the computational request specifying the first hash result, the first random number, and a length value specifying the second length, and (3) generating the secure cookie based on generating a second hash result, the second hash result generated based on supplying the first hash result and a prescribed secure key to the hash generator for generation of the second hash result according to the prescribed hash function, the prescribed secure key known only by the server device, the secure cookie containing the second hash result; and outputting by the server device to the client a challenge that includes the computational request and the secure cookie, the challenge requiring the client to determine the second random number and return a client response specifying the first random number, the second random number, the first hash result, and the secure cookie, as a condition precedent to the server device performing work for the client.

2. The method of claim 1, wherein:
the generating of the secure cookie includes generating a unique identifier associated with the request;
the generating of the second hash result includes supplying the length value and the unique identifier with the first hash result and the prescribed secure key to the hash generator for the generation of the second hash result;
the outputting of the challenge further including specifying in the challenge that the client is further required to specify the length value in the client response.

3. The method of claim 2, wherein the unique identifier includes a time stamp generated by the server device and a network address of the client retrieved from the request.

4. The method of claim 3, wherein the generating of the secure cookie includes combining the second hash result and the time stamp as respective portions of the secure cookie, the time stamp readable by the server device based on parsing the secure cookie.

5. The method of claim 4, further comprising:
receiving by the server device a second client request that includes a response to the challenge, the response to the challenge including the first random number, a candidate number having been determined by the client as the second random number, the length value, and the secure cookie;
determining by the server device whether the response to the challenge is valid, relative to the secure cookie in the second client request, based on:
(1) retrieving a client network address from the second client request,
(2) generating a third hash result according to the prescribed hash function based on supplying, from the second client request, the first random number, the candidate number, the length value, the client network address, the time stamp from the secure cookie, and the prescribed secure key stored within the server device, to the hash generator for generation of the third hash result according to the prescribed hash function, and
(3) determining whether the client response is valid based on whether the third hash result matches the second hash result in the secure cookie retrieved from the second client request; and
the server device selectively performing work according to the second client request, based on determining that the client response is valid.

6. The method of claim 2, further comprising:
receiving by the server device a second client request that includes a response to the challenge, the response to the challenge including the first random number, a candidate number having been determined by the client as the second random number, the length value, and the secure cookie;
determining by the server device whether the response to the challenge is valid, relative to the secure cookie in the second client request, based on:
(1) generating a candidate unique identifier from selected fields of the second client request corresponding to fields selected by the server device during generation of the unique identifier,
(2) generating a third hash result according to the prescribed hash function based on supplying, from the second client request, the first random number, the candidate number, the length value, the candidate unique identifier, and the prescribed secure key stored within the server device, to the hash generator for generation of the third hash result according to the prescribed hash function, and
(3) determining whether the client response is valid based on whether the third hash result matches the second hash result in the secure cookie retrieved from the second client request; and
the server device selectively performing work according to the second client request, based on determining that the client response is valid.

7. The method of claim 1, further comprising:
receiving by the server device a second client request that includes a response to the challenge, the response to the challenge including the first random number, a candidate number having been determined by the client as the second random number, and the secure cookie;
determining by the server device whether the response to the challenge is valid, relative to the secure cookie in the second client request, based on:
(1) generating a third hash result according to the prescribed hash function based on supplying, from the second client request, the first random number, the candidate number, and the prescribed secure key stored within the server device, to the hash generator for generation of the third hash result according to the prescribed hash function, and
(2) determining whether the client response is valid based on whether the third hash result matches the second hash result in the secure cookie retrieved from the second client request; and
the server device selectively performing work according to the second client request, based on determining that the client response is valid.

8. The method of claim 1, further comprising the server device repeating the generating of a computational request and a secure cookie, and the outputting of a corresponding challenge, for each received request that does not include a client response specifying the corresponding first random number, second random number, first hash result, and secure cookie.

9. The method of claim 1, further comprising the server device clearing the request, the computational request, the secure cookie, the length value, and the challenge from a memory in the server device upon completion of the outputting of the challenge to the client.

10. A server device configured for receiving a request from a client computer, the server device comprising:
a network interface configured for receiving the request from the client computer via an Internet Protocol (IP) network and outputting a challenge from the server device to the client computer via the IP network;

a memory configured for storing a prescribed secure key known only by the server device;

a hash generator configured for outputting a hash result having a prescribed length in bits according to a prescribed hash function; and an executable resource configured for generating, and inserting into the challenge, a computational request and a secure cookie, the executable resource configured for:

(1) selecting a first random number having the prescribed length, and a second random number having a second length in bits selected according to a corresponding selected difficulty level for the computational request, and supplying the first random number and the second random number to the hash generator for generation of a first hash result, (2) supplying to the hash generator the first hash result and the prescribed secure key for generation of a second hash result, and (3) inserting the first random number, a length value specifying the second length, and the first hash result into the computational request and inserting the second hash result into the secure cookie, the challenge requiring the client computer to generate a client response specifying the first random number, the second random number, the first hash result, the length value, and the secure cookie, as a condition precedent to the server device performing work for the client computer.

11. The server device of claim 10, wherein:

the executable resource is configured for generating a unique identifier associated with the request;

the executable resource is configured for supplying the first hash result, the length value, the prescribed secure key, and the unique identifier to the hash generator for generation of the second hash result;

the executable resource is configured for specifying in the challenge that the client computer is further required to specify the length value in the client response.

12. The server device of claim 11, wherein the executable resource is configured for generating the unique identifier by generating a time stamp and retrieving from the request a network address of the client computer.

13. The server device of claim 12, wherein:

the executable resource is configured for generating the second hash result based on supplying the first hash result, the length value, the time stamp, the network address of the client computer, and the prescribed secure key to the hash generator;

the executable resource is configured for generating the secure cookie based on combining the second hash result and the time stamp as respective portions of the secure cookie, the time stamp readable by the server device based on parsing the secure cookie.

14. The server device of claim 13, wherein:

the network interface is configured for receiving a second client request that includes a response to the challenge, the response to the challenge including the first random number, a candidate number having been determined by the client computer as the second random number, the length value, and the secure cookie;

the executable resource is configured for determining whether the response to the challenge is valid, relative to the secure cookie in the second client request, based on:

(1) retrieving a client network address from the second client request, (2) generating a third hash result according to the prescribed hash function based on supplying, from the second client request, the first random number, the candidate number, the length value, the client network address, the time stamp from the secure cookie, and the prescribed secure key stored within the server device, to the hash generator for generation of the third hash result according to the prescribed hash function, and (3) determining whether the client response is valid based on whether the third hash result matches the second hash result in the secure cookie retrieved from the second client request; and the executable resource is configured for selectively performing work according to the second client request, based on determining that the client response is valid.

15. The server device of claim 11, wherein:

the network interface is configured for receiving a second client request that includes a response to the challenge, the response to the challenge including the first random number, a candidate number having been determined by the client computer as the second random number, the length value, and the secure cookie;

the executable resource is configured for determining whether the response to the challenge is valid, relative to the secure cookie in the second client request, based on:

(1) generating a candidate unique identifier from selected fields of the second client request corresponding to fields selected by the server device during generation of the unique identifier, (2) generating a third hash result according to the prescribed hash function based on supplying, from the second client request, the first random number, the candidate number, the length value, the candidate unique identifier, and the prescribed secure key stored within the server device, to the hash generator for generation of the third hash result according to the prescribed hash function, and (3) determining whether the client response is valid based on whether the third hash result matches the second hash result in the secure cookie retrieved from the second client request; and the executable resource is configured for selectively performing work according to the second client request, based on determining that the client response is valid.

16. The server device of claim 10, wherein:

the network interface is configured for receiving a second client request that includes a response to the challenge, the response to the challenge including the first random number, a candidate number having been determined by the client computer as the second random number, and the secure cookie;

the executable resource is configured for determining whether the response to the challenge is valid, relative to the secure cookie in the second client request, based on:

(1) generating a third hash result according to the prescribed hash function based on supplying, from the second client request, the first random number, the candidate number, and the prescribed secure key stored within the server device, to the hash generator for generation of the third hash result according to the prescribed hash function, and (2) determining whether the client response is valid based on whether the third hash result matches the second hash result in the secure cookie retrieved from the second client request; and the executable resource is configured for selectively performing work according to the second client request, based on determining that the client response is valid.

17. The server device of claim 10, wherein the executable resource is configured for repeating the generating of a computational request and a secure cookie, and the outputting of a corresponding challenge, for each received request that does not include a client response specifying the corresponding first random number, second random number, first hash result, and secure cookie.

18. The server device of claim 10, wherein the executable resource is configured for clearing the request, the computational request, the secure cookie, the length value, and the challenge from the memory upon completion of the outputting of the challenge to the client computer.

19. A computer readable storage medium having stored thereon sequences of instructions for a server receiving a request from a client, the sequences of instructions including instructions for:
    generating by the server, in response to the request, a computational request and a secure cookie, by:
    (1) selecting a first random number having a prescribed length in bits, a second length in bits corresponding to a difficulty level for the computational request, and a second random number having the second length,
    (2) generating a first hash result having the prescribed length and based on supplying the first random number and the second random number to a hash generator in the server for generation of the first hash result according to a prescribed hash function, the computational request specifying the first hash result, the first random number, and a length value specifying the second length, and
    (3) generating the secure cookie based on generating a second hash result, the second hash result generated based on supplying the first hash result and a prescribed secure key according to the prescribed hash function, the prescribed secure key known only by the server, the secure cookie containing the second hash result; and
    outputting by the server to the client a challenge that includes the computational request and the secure cookie, the challenge requiring the client to determine the second random number and return a client response specifying the first random number, the second random number, the first hash result, and the secure cookie, as a condition precedent to the server performing work for the client.

20. The medium of claim 19, wherein:
    the generating of the secure cookie includes generating a unique identifier associated with the request;
    the generating of the second hash result includes supplying the length value and the unique identifier with the first hash result and the prescribed secure key to the hash generator for the generation of the second hash result;
    the outputting of the challenge further including specifying in the challenge that the client is further required to specify the length value in the client response.

21. The medium of claim 19, further comprising instructions for:
    receiving a second client request that includes a response to the challenge, the response to the challenge including the first random number, a candidate number having been determined by the client as the second random number, and the secure cookie;
    determining whether the response to the challenge is valid, relative to the secure cookie in the second client request, based on:
    (1) generating a third hash result according to the prescribed hash function based on supplying, from the second client request, the first random number, the candidate number, and the prescribed secure key stored within the server, to the hash generator for generation of the third hash result according to the prescribed hash function, and
    (2) determining whether the client response is valid based on whether the third hash result matches the second hash result in the secure cookie retrieved from the second client request; and
    selectively performing work according to the second client request, based on determining that the client response is valid.

22. The medium of claim 19, further comprising instructions for repeating the generating of a computational request and a secure cookie, and the outputting of a corresponding challenge, for each received request that does not include a client response specifying the corresponding first random number, second random number, first hash result, and secure cookie.

23. The medium of claim 19, further comprising instructions for clearing the request, the computational request, the secure cookie, the length value, and the challenge from a memory in the server device upon completion of the outputting of the challenge to the client.

24. A server device configured for receiving a request from a client computer via an Internet Protocol (IP) network, the server device comprising:
    a memory configured for storing a prescribed secure key known only by the server device;
    a hash generator configured for outputting a hash result having a prescribed length in bits according to a prescribed hash function;
    a module configured to generate, in response to the request received from the client computer via the IP network, a computational request and a secure cookie, by:
    (1) selecting a first random number having the prescribed length in bits, a second length in bits corresponding to a difficulty level for the computational request, and a second random number having the second length,
    (2) generating a first hash result having the prescribed length and based on supplying the first random number and the second random number to the hash generator for generation of the first hash result according to the prescribed hash function, the computational request specifying the first hash result, the first random number, and a length value specifying the second length, and
    (3) generating the secure cookie based on generating a second hash result, the second hash result generated based on supplying the first hash result and the prescribed secure key to the hash generator for generation of the second hash result according to the prescribed hash function, the secure cookie containing the second hash result; and
    a network interface configured for receiving the request from the client computer via the IP network, the network interface further configured for outputting to the client computer a challenge that includes the computational request and the secure cookie, the challenge requiring the client computer to determine the second random number and return a client response specifying the first random number, the second random number, the first hash result, and the secure cookie, as a condition precedent to the server device performing work for the client computer.

25. The server device of claim 24, wherein:
    the generating means is configured for generating the secure cookie based on generating a unique identifier associated with the request, and generating the second hash result based on supplying the length value and the unique identifier with the first hash result and the prescribed secure key to the hash generator for generation of the second hash result;

the outputting means configured for specifying in the challenge that the client computer is further required to specify the length value in the client response.

26. The server device of claim 25, wherein the generating means is configured for generating the unique identifier by generating a time stamp and retrieving from the request a network address of the client computer.

27. The server device of claim 26, wherein the generating means is configured for generating the secure cookie based on combining the second hash result and the time stamp as respective portions of the secure cookie, the time stamp readable by the server device based on parsing the secure cookie.

28. The server device of claim 27, wherein:
the outputting means is configured for receiving a second client request that includes a response to the challenge, the response to the challenge including the first random number, a candidate number having been determined by the client computer as the second random number, the length value, and the secure cookie;
the generating means is configured for determining whether the response to the challenge is valid, relative to the secure cookie in the second client request, based on:
(1) retrieving a client network address from the second client request,
(2) generating a third hash result according to the prescribed hash function based on supplying, from the second client request, the first random number, the candidate number, the length value, the client network address, the time stamp from the secure cookie, and the prescribed secure key stored within the server device, to the hash generator for generation of the third hash result according to the prescribed hash function, and
(3) determining whether the client response is valid based on whether the third hash result matches the second hash result in the secure cookie retrieved from the second client request; and
the server device further comprising means for selectively performing work according to the second client request, based on the generating means having determined that the client response is valid.

29. The server device of claim 25, wherein:
the outputting means is configured for receiving a second client request that includes a response to the challenge, the response to the challenge including the first random number, a candidate number having been determined by the client computer as the second random number, the length value, and the secure cookie;
the generating means is configured for determining whether the response to the challenge is valid, relative to the secure cookie in the second client request, based on:
(1) generating a candidate unique identifier from selected fields of the second client request corresponding to fields selected by the server device during generation of the unique identifier,
(2) generating a third hash result according to the prescribed hash function based on supplying, from the second client request, the first random number, the candidate number, the length value, the candidate unique identifier, and the prescribed secure key stored within the server device, to the hash generator for generation of the third hash result according to the prescribed hash function, and
(3) determining whether the client response is valid based on whether the third hash result matches the second hash result in the secure cookie retrieved from the second client request; and
the server device further comprising means for selectively performing work according to the second client request, based on the generating means having determined that the client response is valid.

30. The server device of claim 24, wherein:
the outputting means is configured for receiving a second client request that includes a response to the challenge, the response to the challenge including the first random number, a candidate number having been determined by the client computer as the second random number, and the secure cookie;
the generating means is configured for determining whether the response to the challenge is valid, relative to the secure cookie in the second client request, based on:
(1) generating a third hash result according to the prescribed hash function based on supplying, from the second client request, the first random number, the candidate number, and the prescribed secure key stored within the server device, to the hash generator for generation of the third hash result according to the prescribed hash function, and
(2) determining whether the client response is valid based on whether the third hash result matches the second hash result in the secure cookie retrieved from the second client request; and
the server device further comprising means for selectively performing work according to the second client request, based on the generating means having determined that the client response is valid.

31. The server device of claim 24, wherein the generating means is configured for repeating the generating of a computational request and a secure cookie, and the outputting means is configured for outputting a corresponding challenge, for each received request that does not include a client response specifying the corresponding first random number, second random number, first hash result, and secure cookie.

32. The server device of claim 24, wherein the generating means and the outputting means each are configured for clearing the request, the computational request, the secure cookie, the length value, and the challenge from the memory upon completion of the outputting of the challenge to the client computer.

33. The method of claim 1, wherein the selecting includes increasing the difficulty level based on at least one of an increased number of requests, or based on determining whether the client is a member of a prescribed membership class.

34. The server device of claim 10, wherein the executable resource is configured for increasing the difficulty level based on at least one of an increased number of requests, or based on determining whether the client computer is a member of a prescribed membership class.

35. The medium of claim 19, wherein the selecting includes increasing the difficulty level based on at least one of an increased number of requests, or based on determining whether the client is a member of a prescribed membership class.

36. The server device of claim 24, wherein the module is configured for increasing the difficulty level based on at least one of an increased number of requests, or based on determining whether the client computer is a member of a prescribed membership class.

* * * * *

UNITED STATES PATENT AND TRADEMARK OFFICE
CERTIFICATE OF CORRECTION

| | | |
|---|---|---|
| PATENT NO. | : 7,694,335 B1 | Page 1 of 1 |
| APPLICATION NO. | : 10/795312 | |
| DATED | : April 6, 2010 | |
| INVENTOR(S) | : Turner et al. | |

It is certified that error appears in the above-identified patent and that said Letters Patent is hereby corrected as shown below:

Column 14, line 29, delete "IF'" and insert --IP-- therefor.

Signed and Sealed this
Eighth Day of February, 2011

David J. Kappos
*Director of the United States Patent and Trademark Office*